US012675336B2

(12) United States Patent
Suriyababu et al.

(10) Patent No.: US 12,675,336 B2
(45) Date of Patent: Jul. 7, 2026

(54) SYSTEM AND METHOD FOR VISUALLY BUILDING CLOUD INFRASTRUCTURE AND RENDERING REQUIRED CONFIGURATIONS

(71) Applicant: JPMorgan Chase Bank, N.A., New York, NY (US)

(72) Inventors: Vasudevan Suriyababu, Pleasanton, CA (US); Arvind Ramalingam, Dublin, CA (US); Gennady Temnikov, Los Gatos, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 421 days.

(21) Appl. No.: 18/507,418

(22) Filed: Nov. 13, 2023

(65) Prior Publication Data

US 2025/0156237 A1      May 15, 2025

(51) Int. Cl.
 *G06F 3/00* (2006.01)
 *G06F 8/65* (2018.01)
 *G06F 9/50* (2006.01)
(52) U.S. Cl.
 CPC .............. *G06F 9/5072* (2013.01); *G06F 8/65* (2013.01)
(58) Field of Classification Search
 CPC ........................................................ G06F 9/48
 See application file for complete search history.

(56) References Cited

U.S. PATENT DOCUMENTS 5,261,043 A * 11/1993 Wolber ..................... G06F 8/34
                                                            715/763
11,475,052 B1 * 10/2022 Nielsen ................... G06F 16/23

| | | | | |
|---|---|---|---|---|
| 2011/0047516 | A1* | 2/2011 | Pavan .................... | G06Q 10/06 715/853 |
| 2015/0254262 | A1* | 9/2015 | Lin ...................... | G06F 16/9558 715/205 |
| 2017/0228110 | A1* | 8/2017 | Arora .................. | G05B 19/0426 |
| 2019/0187877 | A1* | 6/2019 | Scattolin ................... | G06F 8/34 |
| 2023/0137352 | A1* | 5/2023 | Gottehrer .............. | H04L 67/306 709/219 |
| 2024/0134678 | A1* | 4/2024 | Turim ................. | G06F 9/45558 |

OTHER PUBLICATIONS

Joanna Chen, DeviceEditor visual biological CAD canvas (Year: 2012).*

* cited by examiner

*Primary Examiner* — Lechi Truong
(74) *Attorney, Agent, or Firm* — Greenblum & Bernstein, P.L.C.

(57) ABSTRACT

A method and system for visually generating a free-form cloud infrastructure are disclosed. The method includes displaying, on a display, multiple icons corresponding to multiple cloud components and a free-form virtual canvas, receiving a selection of a first icon among the multiple icons, and inputting the selected first icon on the virtual canvas. The method further includes receiving a selection of a second icon among the multiple icons, and determining a connection compatibility between a first cloud component and a second cloud component corresponding to the first and second icons. When the connection is possible, displaying one or more possible connections between the first icon and the second icon and receiving a selection of a target connection, and establishing a connection between the first cloud component and the second cloud component for generating custom serialized canvas data for provisioning a custom cloud infrastructure.

18 Claims, 8 Drawing Sheets

Figure 6:
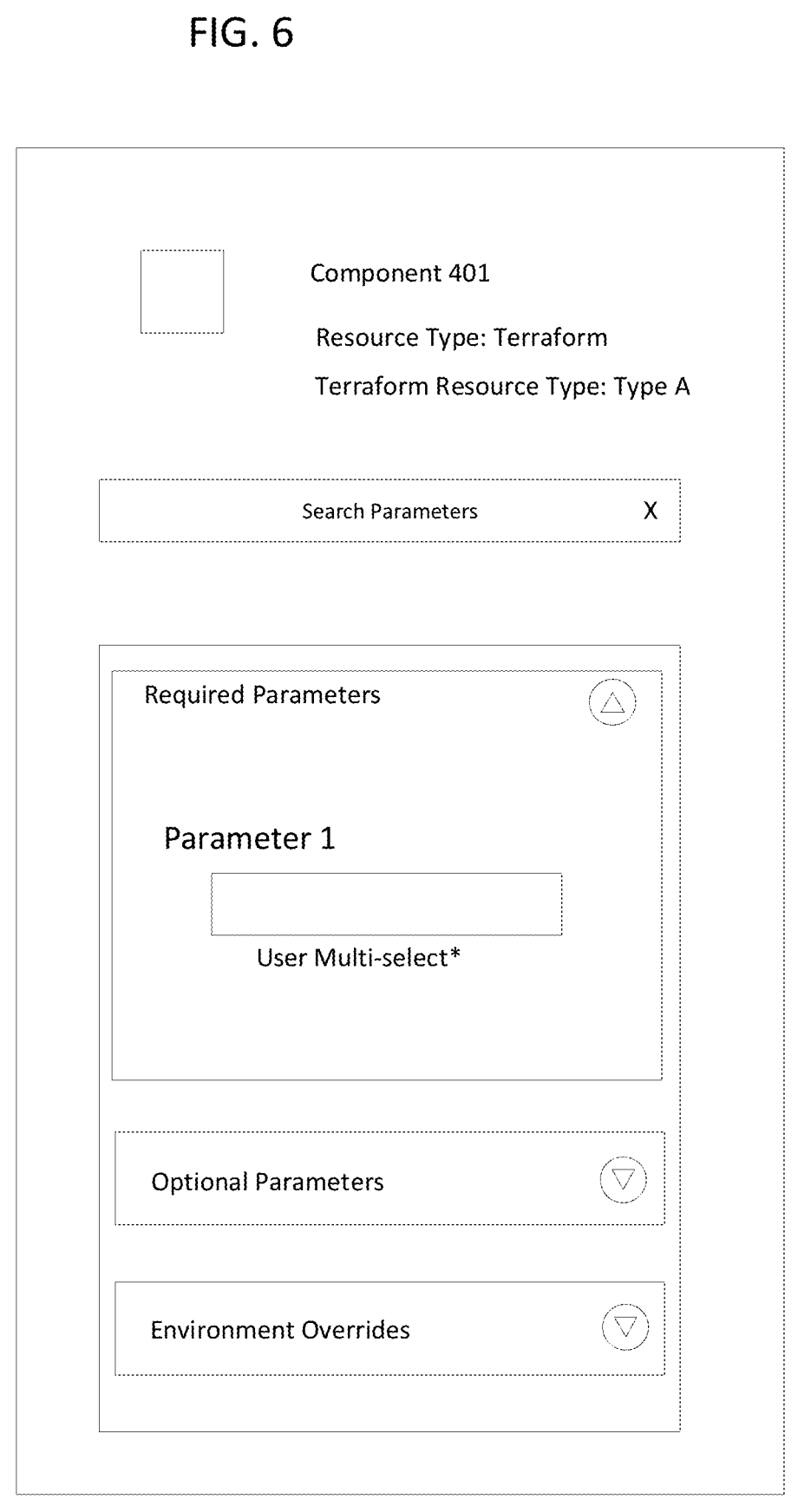

Component 401

Resource Type: Terraform

Terraform Resource Type: Type A

Search Parameters                                    X

Required Parameters                          △

Parameter 1

User Multi-select*

Optional Parameters                          ▽

Environment Overrides                        ▽

FIG. 7A

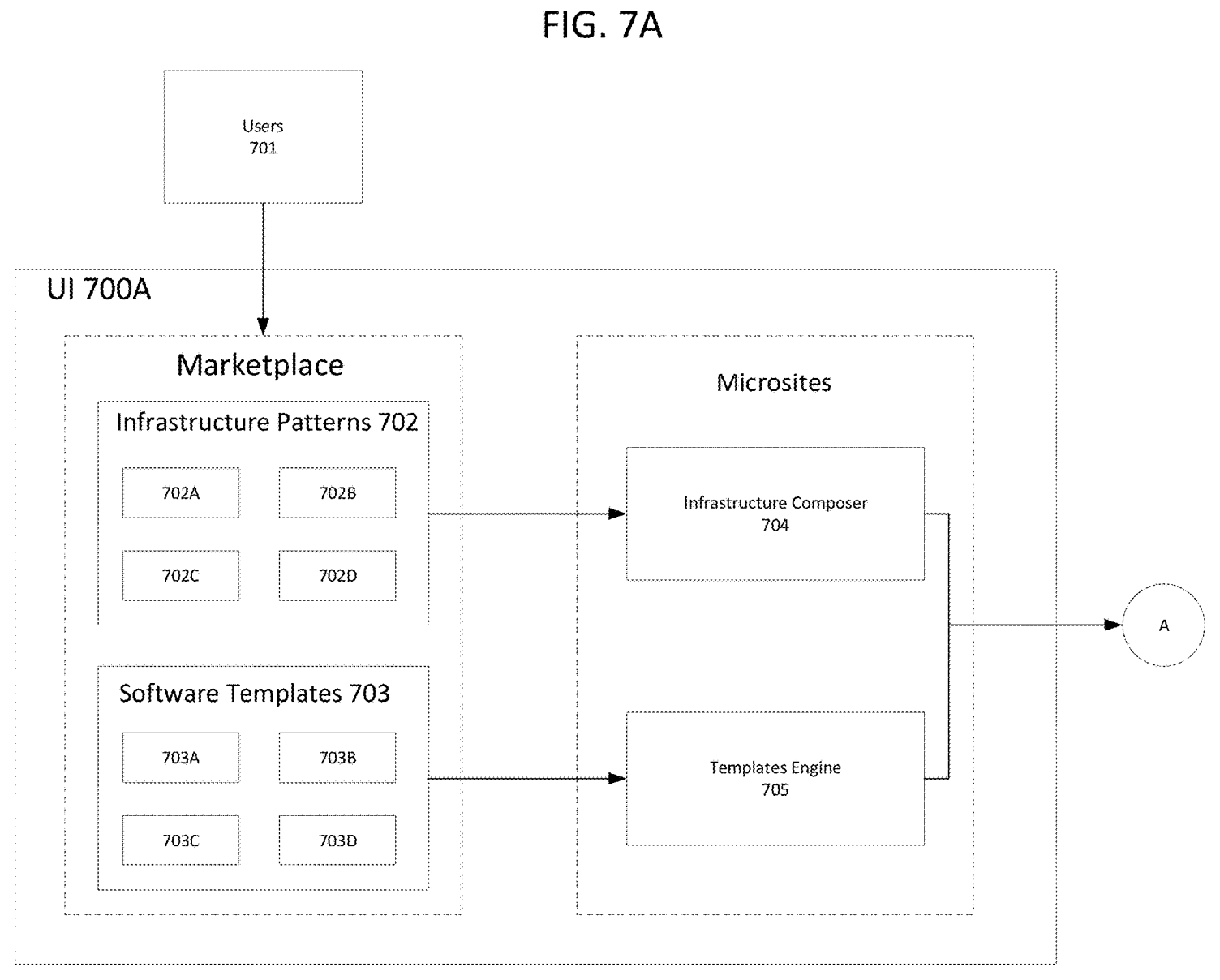

Users
701

UI 700A

Marketplace

Infrastructure Patterns 702

702A 702B 702C 702D

Software Templates 703

703A 703B 703C 703D

Microsites

Infrastructure Composer
704

Templates Engine
705

Figure 7B:
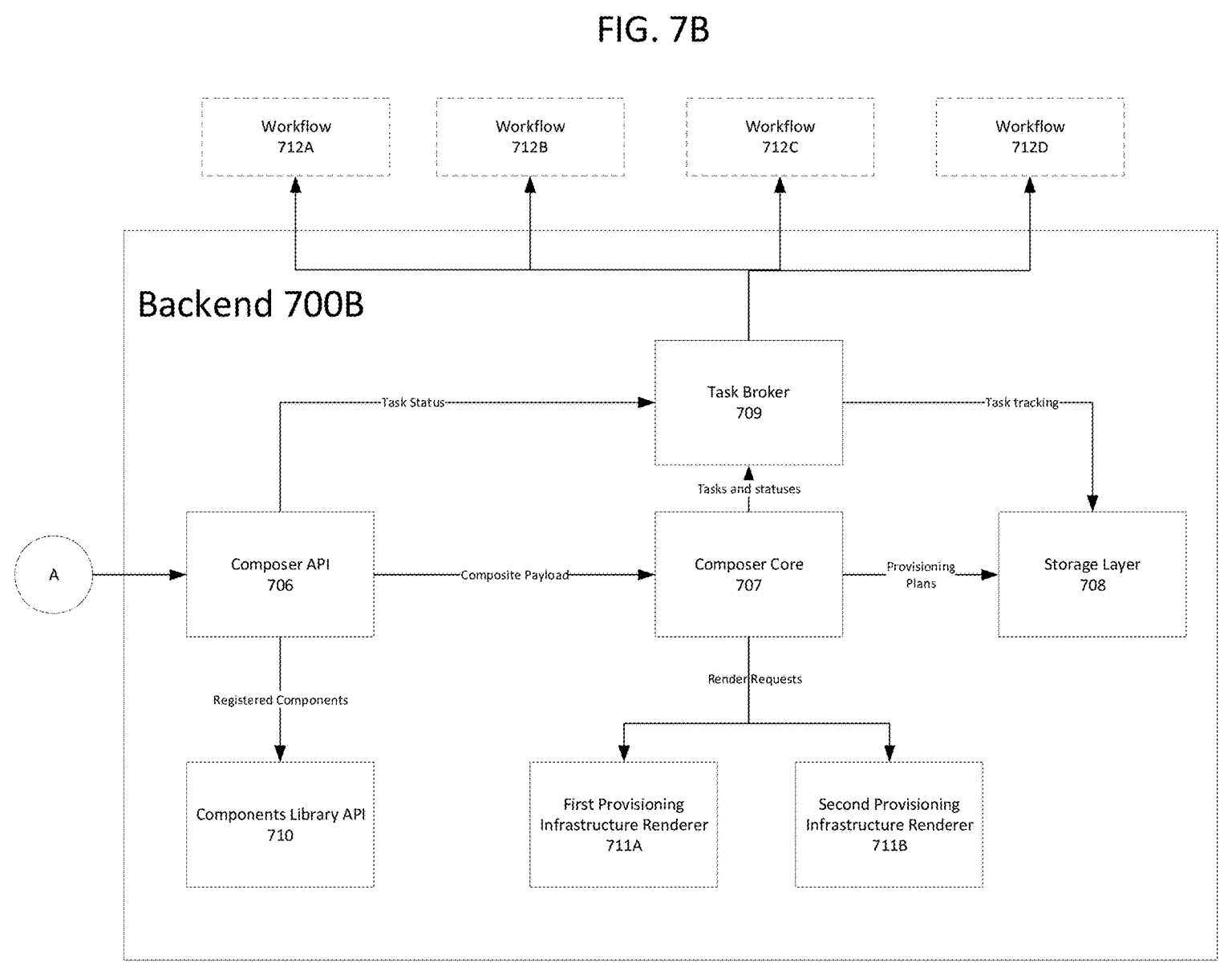

Backend 700B

Workflow 712A

Workflow 712B

Workflow 712C

Workflow 712D

Task Broker 709

Composer Core 707

Storage Layer 708

Second Provisioning Infrastructure Renderer 711B

First Provisioning Infrastructure Renderer 711A

Composer API 706

Components Library API 710

Task Status

Task tracking

Tasks and statuses

Provisioning Plans

RenderRequests

Composite Payload

Registered Components

A

SYSTEM AND METHOD FOR VISUALLY BUILDING CLOUD INFRASTRUCTURE AND RENDERING REQUIRED CONFIGURATIONS

TECHNICAL FIELD

This disclosure generally relates to data processing. More specifically, the present disclosure generally relates to facilitating visual building of a cloud infrastructure and rendering required configurations.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Given recent popularity of the cloud computing, developers of an organization are facing an increase of infrastructure operation cognitive overload. Further, operational cost for application teams has been increasing. For instantiating cloud infrastructure and to perform certain operations, such as upgrades, developers are having to review a myriad of documents, consume templates, customize templates, deploy their infrastructure and maintain it on an ongoing basis resulting in operational overhead for application teams. Due to cumbersome nature of providing cloud infrastructure, application, or infrastructure, migration to cloud services have been limited and slow in implementation.

SUMMARY

According to an aspect of the present disclosure, a method for visually generating a free-form cloud infrastructure is provided. The method includes displaying, on a display, a plurality of icons corresponding to a plurality of cloud components and a free-form virtual canvas; receiving, via a processor, a selection of a first icon corresponding to a first cloud component among the plurality of icons; inputting, via the processor, the selected first icon on the free-form virtual canvas; receiving, via the processor, a selection of a second icon corresponding to a second cloud component among the plurality of icons; determining, by the processor, a connection compatibility between the first cloud component and the second cloud component; when the connection compatibility between the first cloud component and the second cloud component is determined to be positive, displaying one or more possible connections between the first icon and the second icon and receiving a selection of a target connection among the one or more possible connections; establishing, via the processor, a connection between the first cloud component and the second cloud component for generating custom serialized canvas data for provisioning a custom cloud infrastructure; saving, on a centralized database, the custom serialized canvas data corresponding to the custom cloud infrastructure; and provisioning the custom cloud infrastructure based on the custom serialized canvas data.

According to another aspect of the present disclosure, the inputting is performed using a drag-and-drop operation.

According to another aspect of the present disclosure, the method further includes determining one or more parameters for the selected target connection; and prompting for input of the one or more parameters.

According to yet another aspect of the present disclosure, the input is provided by a selection of a value among a plurality of prepopulated values.

According to another aspect of the present disclosure, a prepopulated value compatible with the target connection is available for selection among the plurality of prepopulated values.

According to a further aspect of the present disclosure, the method further includes performing analysis on the custom cloud infrastructure; and generating a notification based on the performed analysis.

According to yet another aspect of the present disclosure, the notification includes a notification to perform an upgrade or an update.

According to a further aspect of the present disclosure, the method further includes when the connection compatibility between the first cloud component and the second cloud component is determined to be negative, determining one or more requirements for establishing the connection compatibility between the first cloud component and the second cloud component.

According to another aspect of the present disclosure, the method further includes providing an explanation as to why the one or more requirements are required for establishing the connection compatibility between the first cloud component and the second cloud component.

According to a further aspect of the present disclosure, the one or more requirements is inserting a third cloud component.

According to a further aspect of the present disclosure, the third cloud component is added automatically for establishing the connection compatibility.

According to a further aspect of the present disclosure, the third cloud component is recommended to be added for establishing the connection compatibility.

According to a further aspect of the present disclosure, the method further includes downloading, from the centralized database, serialized canvas data; and performing, via the processor, a modification on the downloaded serialized canvas data.

According to a further aspect of the present disclosure, the displaying of the one or more possible connections between the first icon and the second icon includes displaying a direction of dataflow for the one or more possible connections.

According to a further aspect of the present disclosure, the displaying of the one or more possible connections between the first icon and the second icon includes highlighting connection points on the first icon and the second icon.

According to a further aspect of the present disclosure, the method further includes receiving, via the processor, a selection of a third icon corresponding to a third cloud component among the plurality of icons, in which only icons corresponding to cloud components compatible with the first cloud component and the second cloud component are allowed for selection among the plurality of icons.

According to a further aspect of the present disclosure, only icons corresponding to cloud components compatible with the first cloud component are allowed for selection among the plurality of icons.

According to a further aspect of the present disclosure, only icons corresponding to cloud components compatible with the first cloud component are visible for selection among the plurality of icons.

According to an aspect of the present disclosure, a system for visually generating a free-form cloud infrastructure is provided. The system includes a memory, a display and a processor. The system is configured to perform: displaying, on a display, a plurality of icons corresponding to a plurality of cloud components and a free-form virtual canvas; receiving a selection of a first icon corresponding to a first cloud component among the plurality of icons; inputting the selected first icon on the free-form virtual canvas; receiving a selection of a second icon corresponding to a second cloud component among the plurality of icons; determining a connection compatibility between the first cloud component and the second cloud component; when the connection compatibility between the first cloud component and the second cloud component is determined to be positive, displaying one or more possible connections between the first icon and the second icon and receiving a selection of a target connection among the one or more possible connections; establishing a connection between the first cloud component and the second cloud component for generating custom serialized canvas data for provisioning a custom cloud infrastructure; saving, on a centralized database, the custom serialized canvas data corresponding to the custom cloud infrastructure; and provisioning the custom cloud infrastructure based on the custom serialized canvas data.

According to another aspect of the present disclosure, a non-transitory computer readable storage medium that stores a computer program for visually generating a free-form cloud infrastructure is provided. The computer program, when executed by a processor, causes a system to perform multiple processes including: displaying, on a display, a plurality of icons corresponding to a plurality of cloud components and a free-form virtual canvas; receiving a selection of a first icon corresponding to a first cloud component among the plurality of icons; inputting the selected first icon on the free-form virtual canvas; receiving a selection of a second icon corresponding to a second cloud component among the plurality of icons; determining a connection compatibility between the first cloud component and the second cloud component; when the connection compatibility between the first cloud component and the second cloud component is determined to be positive, displaying one or more possible connections between the first icon and the second icon and receiving a selection of a target connection among the one or more possible connections; establishing a connection between the first cloud component and the second cloud component for generating custom serialized canvas data for provisioning a custom cloud infrastructure; saving, on a centralized database, the custom serialized canvas data corresponding to the custom cloud infrastructure; and provisioning the custom cloud infrastructure based on the custom serialized canvas data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 illustrates a menu for providing various parameters for a cloud component in accordance with an exemplary embodiment.

FIGS. 7A-7B illustrate a system flow facilitating a visual cloud provisioning in accordance with an exemplary embodiment.

DETAILED DESCRIPTION

Figure 1:
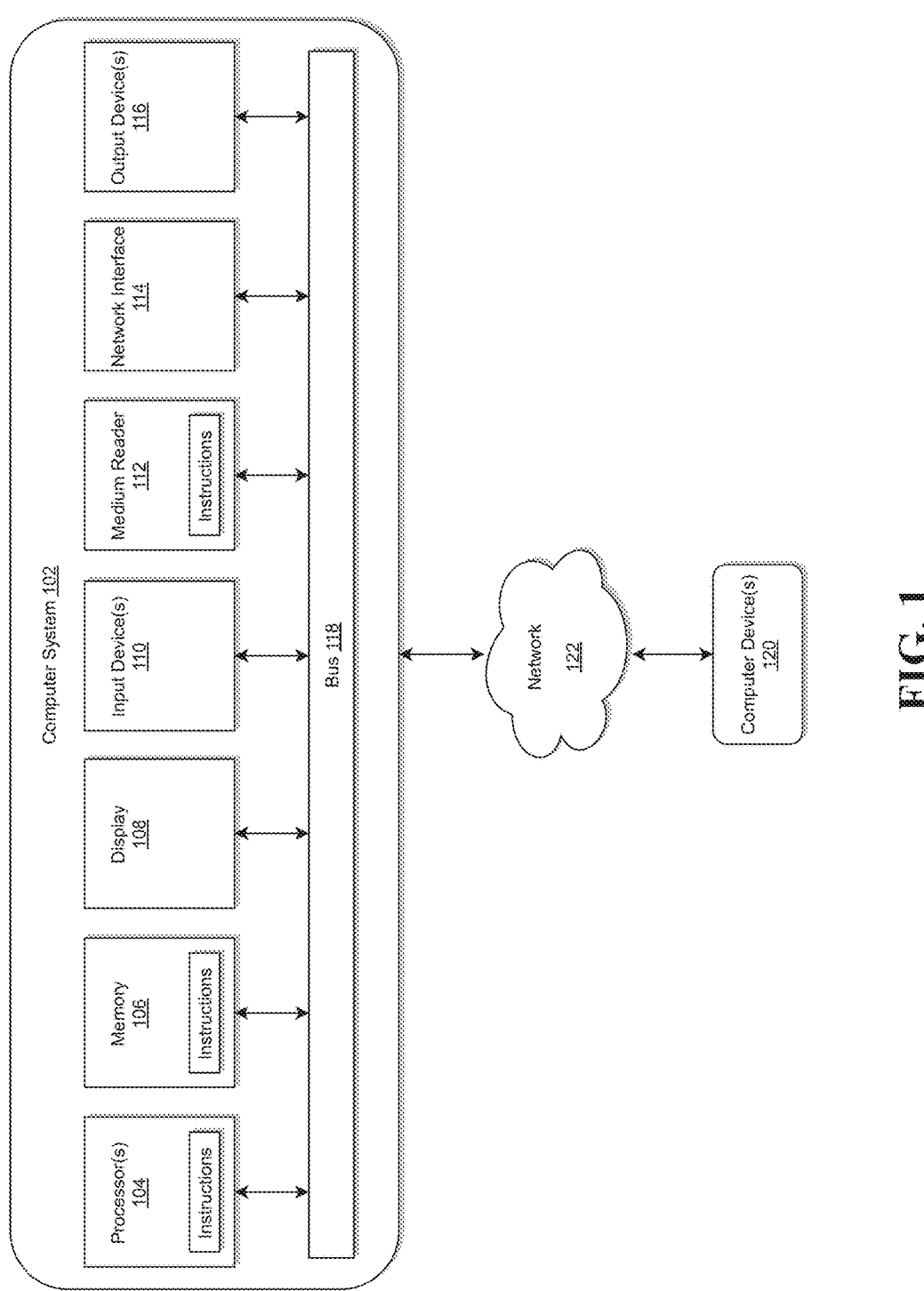
FIG. 1 illustrates a computer system for implementing a visual cloud provisioning (VCP) system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a visual cloud provisioning (VCP) system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
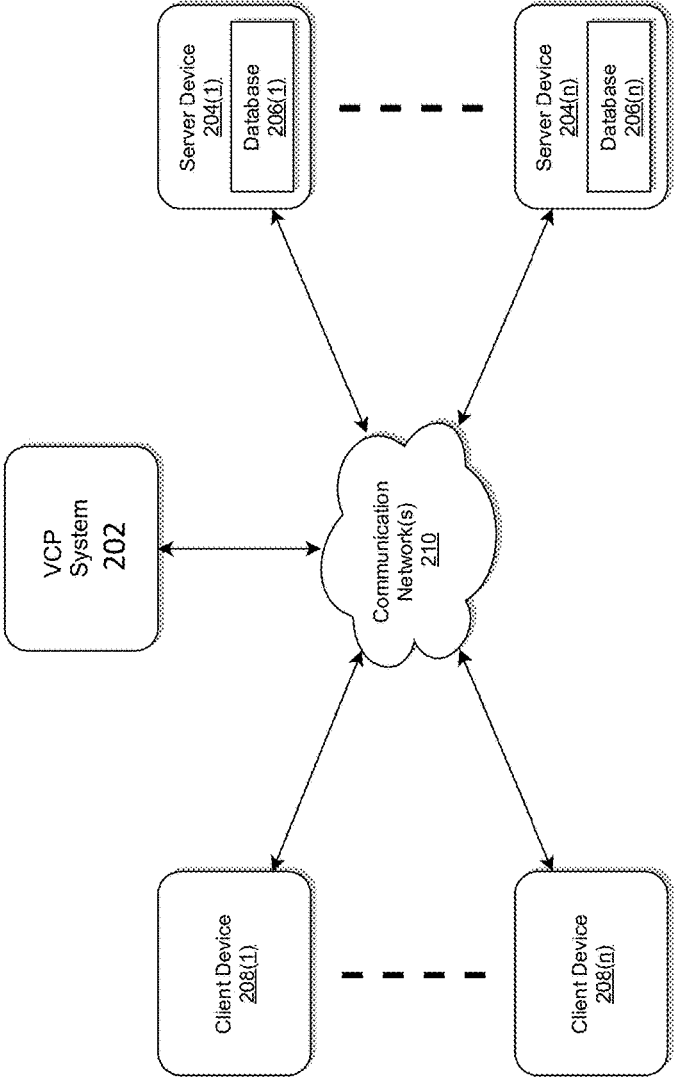
FIG. 2 illustrates an exemplary diagram of a network environment with a VCP system in accordance with an exemplary embodiment.

FIG. 2 illustrates an exemplary diagram of a network environment with a VCP system in accordance with an exemplary embodiment.

A VCP system 202 may be implemented with one or more computer systems similar to the computer system 102 as described with respect to FIG. 1.

The VCP system 202 may store one or more applications that can include executable instructions that, when executed by the VCP system 202, cause the VCP system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the VCP system 202 itself, may be located in virtual server(s) running in a cloud-based computing environment rather than being tied to one or more specific physical network computing devices. Also, the application(s) may be running in one or more virtual machines (VMs) executing on the VCP system 202. Additionally, in one or more embodiments of this technology, virtual machine(s) running on the VCP system 202 may be managed or supervised by a hypervisor.

In the network environment 200 of FIG. 2, the VCP system 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the VCP system 202, such as the network interface 114 of the computer system 102 of FIG. 1, operatively couples and communicates between the VCP system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the VCP system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The VCP system 202 may be a standalone device or integrated with one or more other devices or apparatuses, such as one or more of the server devices 204(1)-204(n), for example. In one particular example, the VCP system 202 may be hosted by one of the server devices 204(1)-204(n), and other arrangements are also possible. Moreover, one or more of the devices of the VCP system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices **204(1)-204(*n*) in this example may process requests received from the VCP system 202 via the communication network(s) 210** according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices **204(1)-204(*n*) may be hardware or software or may represent a system with multiple servers in a pool, which may include internal or external networks. The server devices 204(1)-204(*n*) hosts the databases 206(1)-206** (*n*) that are configured to store metadata sets, data quality rules, and newly generated data.

Although the server devices **204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a master/slave approach, whereby one of the network computing devices of the server devices 204(1)-204(*n*)** operates to manage and/or otherwise coordinate operations of the other network computing devices.

The server devices **204(1)-204(*n*)** may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices **208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*)**.

According to exemplary embodiments, the client devices **208(1)-208(*n*) in this example may include any type of computing device that can facilitate the implementation of the VCP system 202** that may efficiently provide a platform for implementing a cloud native VCP system module, but the disclosure is not limited thereto.

The client devices **208(1)-208(*n*) may run interface applications, such as standard web browsers or standalone client applications, which may provide an interface to communicate with the VCP system 202 via the communication network(s) 210 in order to communicate user requests. The client devices 208(1)-208(*n*)** may further include, among other features, a display device, such as a display screen or touchscreen, and/or an input device, such as a keyboard, for example.

Although the exemplary network environment 200 with the VCP system 202, the server devices **204(1)-204(*n*), the client devices 208(1)-208(*n*), and the communication network(s) 210** are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the VCP system 202, the server devices **204(1)-204(*n*), or the client devices 208(1)-208(*n*), for example, may be configured to operate as virtual instances on the same physical machine. For example, one or more of the VCP system 202, the server devices 204(1)-204(*n*), or the client devices 208(1)-208(*n*) may operate on the same physical device rather than as separate devices communicating through communication network(s) 210. Additionally, there may be more or fewer VCP system 202, server devices 204(1)-204(*n*), or client devices 208(1)-208** (*n*) than illustrated in FIG. 2. According to exemplary embodiments, the VCP system 202 may be configured to send code at run-time to remote server devices 204(1)-204 (*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
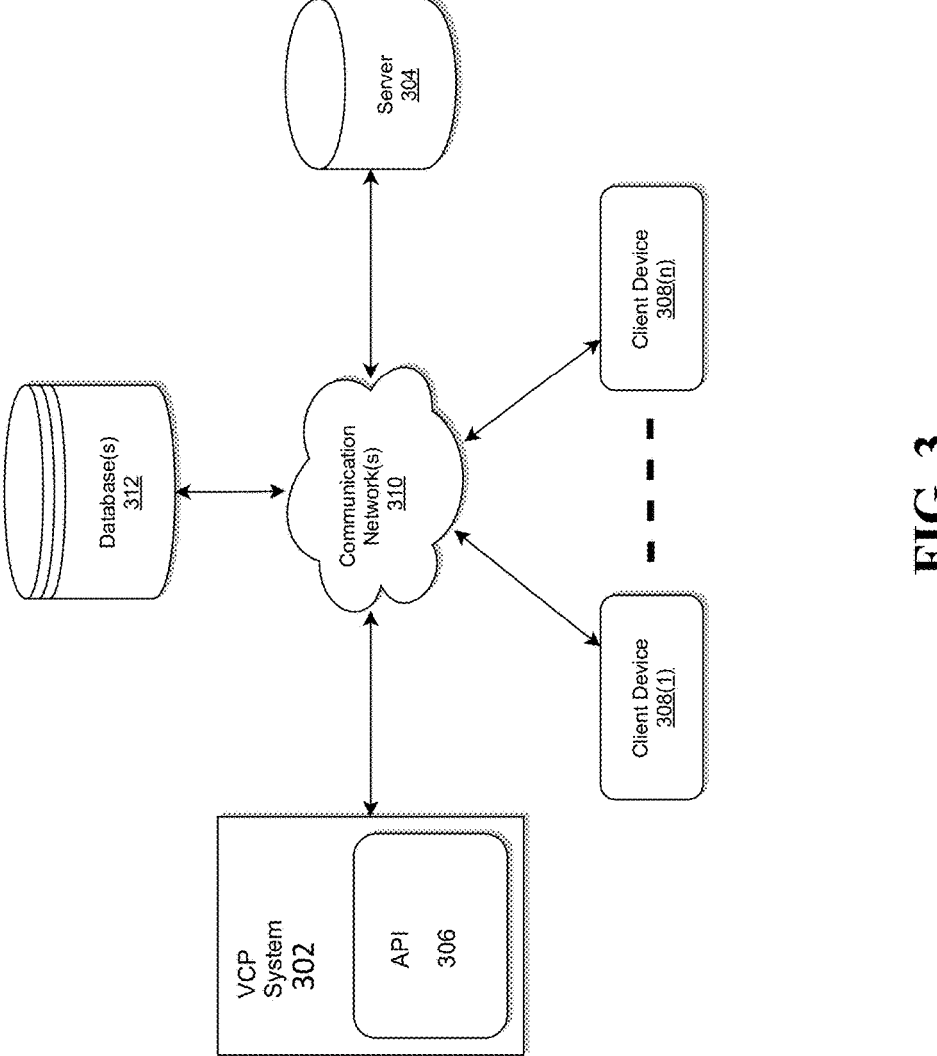
FIG. 3 illustrates a system diagram for implementing a VCP system in accordance with an exemplary embodiment.

FIG. 3 illustrates a system diagram for implementing a VCP system in accordance with an exemplary embodiment.

As illustrated in FIG. 3, the system 300 may include a VCP system 302 within which a group of API modules 306 is embedded, a server 304, a database(s) 312, a plurality of client devices 308(1) . . . 308 (*n*), and a communication network 310.

According to exemplary embodiments, the VCP system 302 including the API modules 306 may be connected to the server 304, and the database(s) 312 via the communication network 310. Although there is only one database that has been illustrated, the disclosure is not limited thereto. Any number of databases may be utilized. The VCP system 302 may also be connected to the plurality of client devices 308(1) . . . 308 (*n*) via the communication network 310, but the disclosure is not limited thereto.

According to exemplary embodiment, the VCP system 302 is described and shown in FIG. 3 as including the API modules 306, although it may include other rules, policies, modules, databases, or applications, for example. According to exemplary embodiments, the database(s) 312 may be embedded within the VCP system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308 (*n*) via the communication network 310.

The API modules 306 may be configured to implement a user interface (UI) platform that is configured to enable VCP system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308 (*n*) are illustrated as being in communication with the VCP system 302. In this regard, the plurality of client devices 308(1) . . . 308 (*n*) may be "clients" of the VCP system 302 and are described herein as such. Nevertheless, it is to be known and understood that the plurality of client devices 308(1) . . . 308 (*n*) need not necessarily be "clients" of the VCP system 302, or any entity described in association therewith herein. Any additional or alternative relationship may exist between either or both of the plurality of client devices 308(1) . . . 308 (*n*) and the VCP system 302, or no relationship may exist.

The first client device 308(1) may be, for example, a smart phone. Of course, the first client device 308(1) may be any additional device described herein. The second client device 308 (*n*) may be, for example, a personal computer (PC). Of course, the second client device 308 (*n*) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308 (*n*) may communicate with the VCP system 302 via broadband or cellular communication. Of course, these embodiments are merely exemplary and are not limiting or exhaustive.

The client devices 308(1) . . . 308 (*n*) may be the same or similar to any one of the client devices 208(1)-208(n) as described with respect to FIG. 2, including any features or combination of features described with respect thereto. The VCP system 302 may be the same or similar to the VCP system 202 as described with respect to FIG. 2, including any features or combination of features described with respect thereto.

Figure 4:
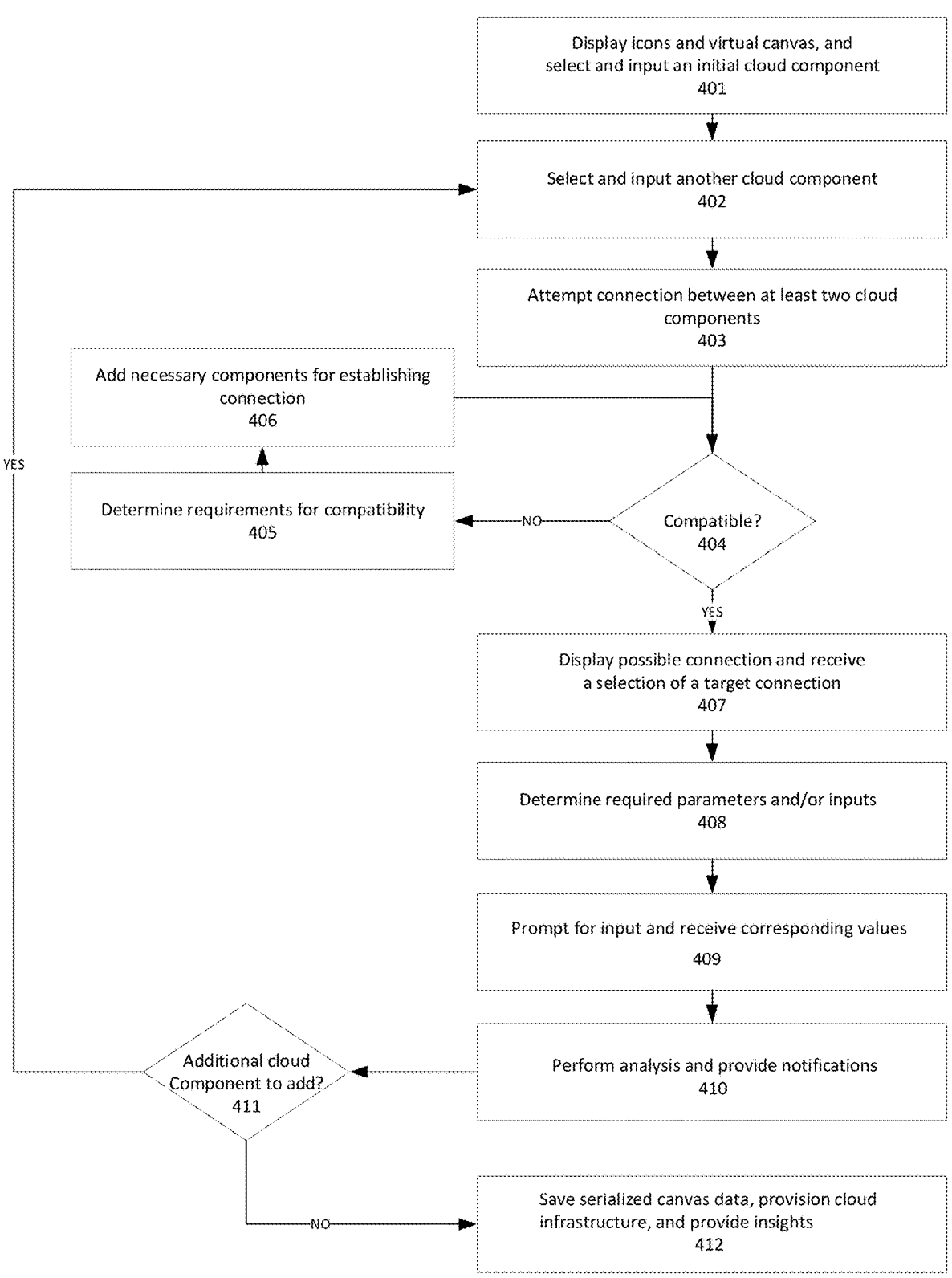
FIG. 4 illustrates a method for generating a custom serialized canvas data reflecting a cloud infrastructure for provisioning in accordance with an exemplary embodiment.
Figure 5:
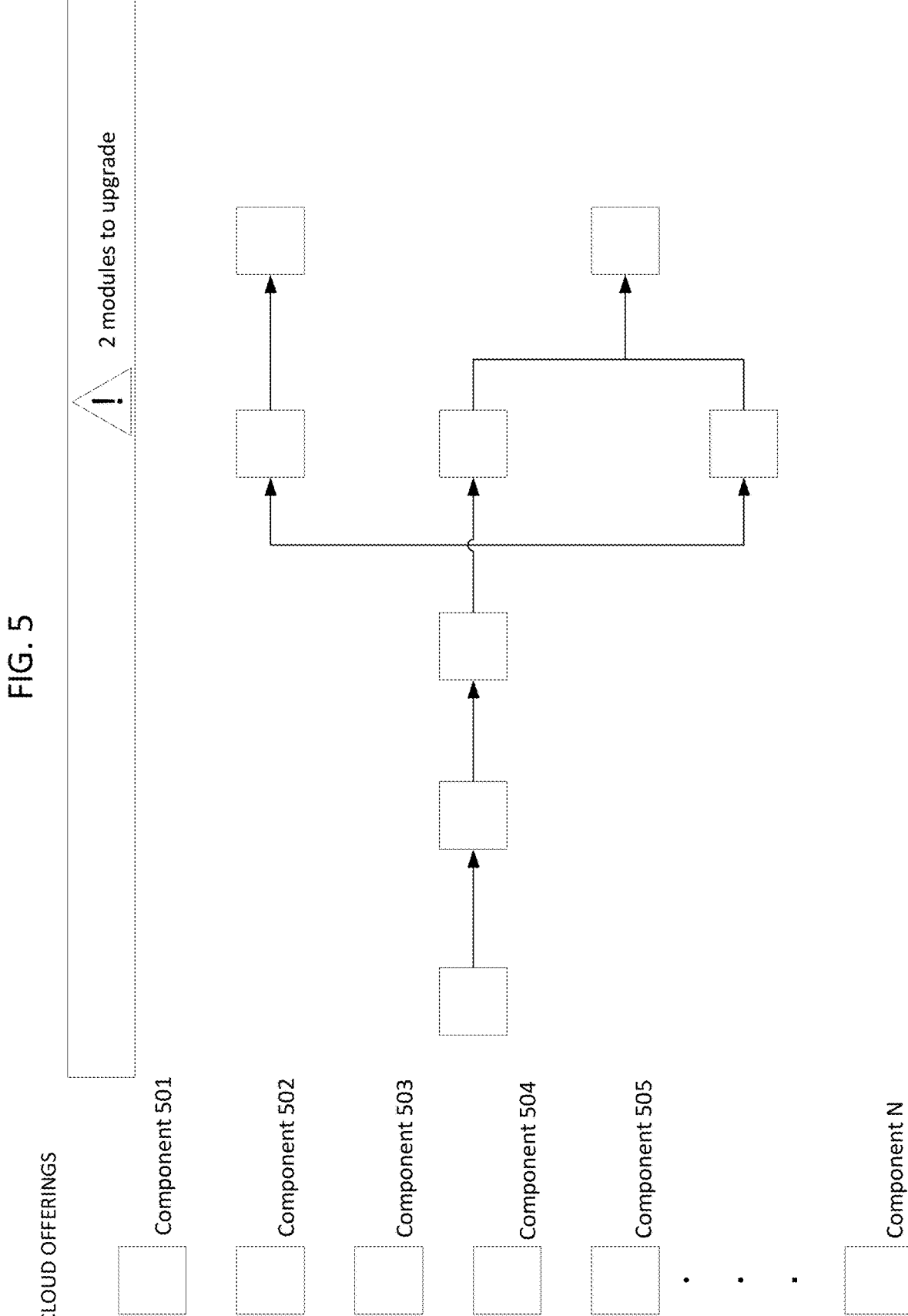
FIG. 5 illustrates an interface for visually building a custom cloud infrastructure using a visual diagram in accordance with an exemplary embodiment.

FIG. 4 illustrates a method for generating a custom serialized canvas data reflecting a cloud infrastructure for provisioning in accordance with an exemplary embodiment. FIG. 5 illustrates an interface for building a custom cloud infrastructure using a visual diagram in accordance with an exemplary embodiment. FIG. 6 illustrates a menu for providing various parameters for a cloud component in accordance with an exemplary embodiment.

According to exemplary aspects, a visual cloud provisioning system and method may be able to accelerate cloud adoption and allow more efficient build and delivery of customized software. Further, the visual cloud provisioning system and method may allow reduction of cognitive overload, operational overhead and operational costs by streamlining infrastructure build process. According to further aspects, the visual cloud provisioning system and method may enable a centralized interface that may be stacked on standardized tools and frameworks to improve software quality, reduce defects/errors in the build, and reduce build time required for delivery of a customized cloud based software or infrastructure.

Typically, a user would require a deep understanding of a myriad of software tools and technologies and also acquire cloud service provider specific knowledge in order to build a cloud based software. For example, a cloud eco-system may include a large number of fragmented tools requiring different skill sets to operate. Lack of sufficient knowledge or skill may result in a cloud software that is unable to function or error-prone, and thus, rendering provisioning of customize cloud applications difficult or inefficient.

In operation 401, a list of various icons corresponding to various cloud components or resources may be displayed on one portion of a user interface, along with a free-form virtual canvas on another portion of the user interface. According to exemplary aspects, a list of various icons may be displayed according to a pattern or infrastructure flavor/type selected by a user. Among a list of cloud component icons, a cloud component may be selected and inputted on the virtual canvas of the user interface for forming a custom serialized canvas data. In an example, the cloud component selected and placed onto a blank canvas for building a new pattern (e.g., serialized canvas data) or cloud infrastructure, or may be added onto a pre-stored pattern. The pre-stored pattern may be previously formed by a user or by an infrastructure engineer.

According to exemplary aspects, the cloud component may be inputted by a drag-and-drop operation. For example, as illustrated in FIG. 5, one of the cloud components (component 501, component 502, component 503, component 504, component 505 and up to component N, where N is a whole number) displayed on the left-hand side of the user interface of the VCP system may be selected and dragged onto a virtual canvas on the right-hand of the user interface. According to exemplary aspects, the virtual canvas may be a freeform canvas with nodes and edges. Further, new serialized canvas data for provisioning a corresponding cloud infrastructure, application or software may be formed on the virtual canvas. However, aspects are not limited thereto, such that existing cloud infrastructure, application or software may be edited, upgraded or otherwise modified on the virtual canvas as well using corresponding serialized canvas data or pattern. Although the cloud component is described as being inputted via the drag-and-drop operation, aspects of the present disclosure are not limited thereto, such that other input mechanisms may be utilized.

In operation 402, another cloud component may be selected among the list of cloud components displayed on the left-hand side of the user interface of the VCP system, and inputted on to the virtual canvas of the VCP system interface. According to exemplary aspects, any of the cloud components may be available for selection and input. However, aspects of the present disclosure may not be limited thereto, such that only the cloud components that may be compatible with the first cloud components may be selectable or shown for selection from the list of cloud components.

In operation 403, a connection between the two inputted cloud components may be attempted. According to exemplary aspects, the connection may refer to a network connection, data connection, a continuous connection, intermittent connection or the like. Moreover, the connection may additionally include a direction of flow between the cloud components, such that the connection may only be established in a particular direction. For example, a connection may establish a dataflow direction from a first cloud component to a second cloud component, but not the other way around. Moreover, the connection may additionally indicate whether the connection is established on the same network, across multiple networks, on a private cloud, on a public cloud, across both private and public cloud, and the like.

In operation 404, once a connection between the two inputted cloud components is attempted, a determination is made as to whether the two inputted cloud components are compatible or not. If the two inputted cloud components are determined not to be compatible, the method proceeds to operation 405 for further determination of requirements for compatibility. On the other hand, if the two inputted cloud components are determined to be compatible, the method proceed to operation 407 to display potential or possible connection points on the two inputted cloud components.

More specifically, in operation 405, one or more requirements for establishing a connection between the two cloud components may be determined. In an example, the one or more requirements may include, without limitation, various dependencies, one or more intervening cloud components, authorizations, and the like. Although requirements for establishing a connection between the two cloud components are discussed herein, aspects of the present disclosure are not limited thereto, such that if additional cloud components are already present on the virtual canvas, additional requirements for establishing a connection to already existing cloud components may additionally be specified.

According to exemplary aspects, the determination of requirements may be performed using a rule-based algorithm or model, based on a system architecture mapping, or using one or more machine learning (ML) or artificial intelligence (AI) algorithms or models.

In an example, AI or ML algorithms may be generative, in that the AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations are initially performed to provide initial training. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, N-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

Once the one or more requirements are determined in operation 405, the determined requirements may be specified on a screen for user input, automatically presented or inputted, displayed for selection or confirmation, or the like in operation 406. When the all of the necessary requirements are added in, another check for compatibility for the modified architecture is performed in operation 404.

In operation 407, once the two inputted cloud components are determined to be compatible in operation 404, the method proceed to operation 407 to display potential or possible connections between the two inputted cloud components, and receive a selection of one of the potential connections. According to exemplary aspects, one or more of the two inputted cloud components may have one or more connection points. In an example, potential connection points may be highlighted to a user for establishing or selecting a connection. In addition to the above, a connection may automatically be established if only one connection is available for establishment. Moreover, in addition to displaying of potential connection or connections, a direction of connection may additionally be displayed. For example, if the data flows from a first cloud component to a second cloud component, such flow of data may be indicated. According to exemplary aspects, the indication of data flow may be provided via arrows, images, highlights or the like. Although a display of potential connection points between the two cloud components are discussed herein, aspects of the present disclosure are not limited thereto, such that if additional cloud components are already present on the virtual canvas, additional connection points and/or direction of data flow for establishing a connection to already existing cloud components may additionally be provided.

In operation 408, for establishing a desired or potential connection between two or more cloud components, required parameters and/or inputs for each of the cloud components may be determined. The required parameters and/or inputs as determined are then automatically populated based on the potential or desired connection in operation 409. However, aspects of the present disclosure are not limited thereto, such that the automated population of parameters may be editable. Further, for certain parameters, input may be prompted. For example, as exemplarily illustrated in FIG. 6, for cloud component 401, a menu screen for inputting various parameters may be displayed to the user. The menu screen may note various configuration details of the cloud component 401. For example, the menu screen may note that the resource type of the cloud component 401 is Type I, and a sub-type of the Type I as Type A. Moreover, the menu screen may display a list of parameters that may be pre-populated for viewing/editing, including required parameters, optional parameters, and environment overrides. In an example, each of the required parameter fields, optional parameters field, and environment overrides may be expanded or collapsed for better visibility of information. In a further example, one or more fields for providing an input may be a selection field that may allow a selection of one or more pre-populated values for entry. For example, parameter 1 may be a drop-down field, in which one or more of the prepopulated values may be selected for entry. Although the drop-down field is described herein, aspects of the present disclosure are not limited thereto, such that other selection fields, such as check box, radio buttons, or the like may be utilized.

According to exemplary aspects, only the compatible values may be shown or selectable for input. By providing a limited set of compatible values, the VCP system may prevent or limit opportunities for the user to input incompatible values that may potentially cause erroneous results or unintended bugs.

Although prompting of parameter input for a cloud component is described as being performed after attempting a connection to another cloud component or resource, aspects of the present disclosure are not limited thereto, such that the prompting of the parameter input may be performed after inputting of each cloud component.

In operation 410, once all of the parameters have been inputted and the connection(s) are established between the cloud components or resources, analysis may be performed on the established connection and the inputted cloud components for potential issues or improvements for the serialized canvas data corresponding to a cloud infrastructure design. Further, when relevant, notifications may be transmitted for the performed analysis. More specifically, when one or more changes are recommended or deemed required based on the performed analysis, the recommended or required changes or updates may be presented as notifications. As exemplarily illustrated in FIG. 5, the notifications may be presented above the virtual canvas with a notification icon. In an example, the notifications may include, without limitation, an incompatible connection, one or more incompatibility, a downstream error, an upstream error, off-line status of one or more of the connected components or resources, presence of an updated module, required updates or upgrades, and the like.

Although the analysis and providing of notifications in operation 410 is described as being performed after building of connections between two or more cloud components or resources, aspects of the present disclosure are not limited thereto, such that the operation 410 may be performed at any given time.

In operation 411, a check is made to determine whether another cloud component or resource is to be added to the cloud infrastructure being built via the custom serialized canvas data. If another cloud component or resource is determined to be added, based on a user's action or based on the cloud infrastructure being built, the method proceeds back to operation 402. On the other hand, if no more cloud components or resources are to be added to the cloud infrastructure being built, the serialized canvas data corresponding to the designed cloud infrastructure is saved on a centralized database in operation 412.

Further, in addition to being saved, the respective serialized canvas data may be deployed onto a cloud environment for provisioning the designed cloud infrastructure for use by one or more users in operation 412. According to further aspects, the saved serialized canvas data may then be uploaded to a centralized data storage for access by other users. More specifically, once stored in the centralized data storage, a copy of the saved serialized canvas data may be used by other users for further modification or utilization for the respective user's purposes. Accordingly, it would be unnecessary for users to generate a new serialized canvas data from scratch every time.

In addition to the above, in operation 412, usage and performance of the deployed cloud infrastructure may be gathered to provide various insights. For example, the VCP system may gather information on usage of the deployed cloud infrastructure for providing insights and respective notifications. For example, insights may include, without limitation, most utilized cloud components, versions of the utilized cloud components, cloud components pending upgrades, cloud components using vulnerable versions, most utilized custom cloud infrastructures, and the like. Further, the VCP system may additionally collect metadata on infrastructure stacks and resources as they are instantiated, which may provide information of infrastructure trends. The available metadata on the infrastructure stacks and resources may also be targeted by custom migration trackers, which may trigger notifications to infrastructure engineers to provide reports on performance of a portfolio of cloud infrastructures.

Moreover, once the cloud infrastructure is saved onto the centralized database, one or more users may leverage the VCP system to make edits to the saved cloud infrastructure or pattern at a later time or stage. According to exemplary aspects, edits may include, without limitation, adding or removing of cloud components or resources, consuming cloud component version upgrades, scaling or traffic shaping or the like. According to further aspects, notification component of the VCP system may notify users to consume newer cloud component version upgrades when they become available for simplifying infrastructure hygiene. However, aspects of the present disclosure are not limited thereto, such that the cloud components may be updated automatically when newer versions of the cloud components become available.

FIGS. 7A-7B illustrate a system flow facilitating a visual cloud provisioning in accordance with an exemplary embodiment.

According to exemplary aspects, an interaction between a user interface (UI) 700A and a backend system 700B may facilitate performance of a visual cloud provisioning. As illustrated in FIG. 7A, the UI 700A includes a marketplace and various microsites. The marketplace includes various infrastructure patterns 702 and various software templates 703. The microsites includes an infrastructure composer 704 and a template engine 705. According to exemplary aspects, the users 701 may select one or more of the infrastructure patterns 702 for processing by the infrastructure composer 704, and may select one or more of the software templates 703 for processing by the templates engine 705.

The infrastructure patterns 702 includes a first infrastructure pattern 702A, a second infrastructure pattern 702B, a third infrastructure pattern 702C and a fourth infrastructure pattern 702D. According to exemplary aspects, each of the infrastructure pattern may refer to a cloud infrastructure, which may be formed by a user or by an infrastructure engineer. Although four infrastructure patterns are illustrated herein, aspects of the present disclosure are not limited thereto, such that more infrastructure patterns may be stored.

The software template 703 includes a first software template 703A, a second software template 703B, a third software template 703C, and a fourth software template 703D. Although four software templates are illustrated herein, aspects of the present disclosure are not limited thereto, such that more software templates may be stored.

The infrastructure composer 704 may coordinate visually building a cloud infrastructure using a list of cloud components or resources and a free-form virtual canvas. According to exemplary aspects, a cloud infrastructure may be built using one of the stored infrastructure patterns 702. However, aspects of the present disclosure are not limited thereto, such that a cloud infrastructure may be built from scratch and without using a pre-formed or stored infrastructure pattern.

As illustrated in FIG. 7B, the backend system 700B includes a composer API 706, a composer core 707, a storage layer 708, a task broker 709, a components library API 710, a first provisioning infrastructure renderer 711A, a second provisioning infrastructure renderer 711B, workflow 712A, workflow 712B, workflow 712C and workflow 712D.

According to exemplary aspects, the composer API 706 may refer to a language/framework agnostic layer configured to visually build patterns or cloud infrastructures, reconcile dependencies and send payload to the backend rendering engines. The composer API 706 may allow initialization of patterns or cloud architecture and facilitate free-from customization of pre-formed patterns that may be prestored by one or more users or infrastructure engineers before consumption of such pre-formed patterns for creating a target state infrastructure. Accordingly, a custom cloud architecture may be built from scratch or by using a pre-formed pattern or cloud architecture.

The components library API 710 may store various cloud resources, and groups. Moreover, the components library API 710 may store various modules, resources, and composition for various provisioning infrastructure workflows. In an example, the various modules, resources and composition may be modeled as cloud offerings, which may be consumed by patterns or cloud infrastructure to be rendered into an infrastructure-as-code (IaC) configuration. Moreover, the components library API 710 may also provide grouping functionality.

The composer core 707 may orchestrate across other components, handle IaC workflows, dependency management and promotion strategy for IaC configuration across environments. For example, the composer core 707 may orchestrate processing of input, rendering of provisioned cloud infrastructure or user provided pattern, and execute provisioning plans.

The task broker 709 may be a lightweight task dispatcher that handles task execution on underlying workflows, such as workflow 712A, workflow 712B, workflow 712C and workflow 712D. For example, the task broker 709 may assign to a queue of one of the workflows. Further, the task broker 709 may execute and provide an updated status.

The first provisioning infrastructure renderer 711A may implement a rendering mechanism for a first type of IaC and may generate a first stage and a second stage configuration based on payload consumed. In an example, the first stage and the second stage may refer to day 1 and day 2. However, aspects of the present disclosure are not limited thereto, such that first and second stages may be divided in various ways, including temporal, event based, metrics based and the like. The second provisioning infrastructure renderer 711B may implement a rendering mechanism for a second type of IaC and may generate a first stage and a second stage configuration based on payload consumed. Although two provisioning infrastructure renderers are illustrated herein, aspects of the present disclosure are not limited thereto, such that more provisioning infrastructure renderers may be utilized for different types of IaC.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for visually generating a free-form cloud infrastructure, the method comprising:

displaying, on a display, a plurality of icons corresponding to a plurality of cloud components and a free-form virtual canvas;

receiving, via a processor, a selection of a first icon corresponding to a first cloud component among the plurality of icons;

inputting, via the processor, the selected first icon on the free-form virtual canvas;

receiving, via the processor, a selection of a second icon corresponding to a second cloud component among the plurality of icons;

determining, by the processor, a connection compatibility between the first cloud component and the second cloud component;

when the connection compatibility between the first cloud component and the second cloud component is determined to be positive, displaying one or more possible connections between the first icon and the second icon and receiving a selection of a target connection among the one or more possible connections;

establishing, via the processor, a connection between the first cloud component and the second cloud component for generating custom serialized canvas data for provisioning a custom cloud infrastructure;

saving, on a centralized database, the custom serialized canvas data corresponding to the custom cloud infrastructure;

provisioning the custom cloud infrastructure based on the custom serialized canvas data;

performing analysis on the custom cloud infrastructure;

generating a notification based on the performed analysis;

downloading, from the centralized database, the custom serialized canvas data corresponding to the custom cloud infrastructure; and performing, via the processor, a modification on the downloaded custom serialized canvas data.

2. The method according to claim 1, wherein the inputting is performed using a drag-and-drop operation.

3. The method according to claim 1, further comprising:

determining one or more parameters for the selected target connection; and prompting for input of the one or mor parameters.

4. The method according to claim 3, wherein the input is provided by a selection of a value among a plurality of prepopulated values.

5. The method according to claim 4, wherein a prepopulated value compatible with the target connection is available for selection among the plurality of prepopulated values.

6. The method according to claim 1, wherein the notification includes a notification to perform an upgrade or an update.

7. The method according to claim 1, further comprising:

when the connection compatibility between the first cloud component and the second cloud component is determined to be negative, determining one or more requirements for establishing the connection compatibility between the first cloud component and the second cloud component.

8. The method according to claim 7, further comprising:

providing an explanation as to why the one or more requirements are required for establishing the connection compatibility between the first cloud component and the second cloud component.

9. The method according to claim 7, wherein the one or more requirements is inserting a third cloud component.

10. The method according to claim 9, wherein the third cloud component is added automatically for establishing the connection compatibility.

11. The method according to claim 9, wherein the third cloud component is recommended to be added for establishing the connection compatibility.

12. The method according to claim 1, wherein the displaying of the one or more possible connections between the first icon and the second icon includes displaying a direction of dataflow for the one or more possible connections.

13. The method according to claim 1, wherein the displaying of the one or more possible connections between the first icon and the second icon includes highlighting connection points on the first icon and the second icon.

14. The method according to claim 1, further comprising:

receiving, via the processor, a selection of a third icon corresponding to a third cloud component among the plurality of icons, wherein only icons corresponding to cloud components compatible with the first cloud component and the second cloud component are allowed for selection among the plurality of icons.

15. The method according to claim 1, wherein only icons corresponding to cloud components compatible with the first cloud component are allowed for selection among the plurality of icons.

16. The method according to claim 1, wherein only icons corresponding to cloud components compatible with the first cloud component are visible for selection among the plurality of icons.

17. A system for visually generating a free-form cloud infrastructure, the system comprising:

a memory; and a processor, wherein the system is configured to perform:

displaying, on a display, a plurality of icons corresponding to a plurality of cloud components and a free-form virtual canvas;

receiving a selection of a first icon corresponding to a first cloud component among the plurality of icons;

inputting the selected first icon on the free-form virtual canvas;

receiving a selection of a second icon corresponding to a second cloud component among the plurality of icons;

determining a connection compatibility between the first cloud component and the second cloud component;

when the connection compatibility between the first cloud component and the second cloud component is determined to be positive, displaying one or more possible connections between the first icon and the second icon and receiving a selection of a target connection among the one or more possible connections;

establishing a connection between the first cloud component and the second cloud component for generating custom serialized canvas data for provisioning a custom cloud infrastructure;

saving, on a centralized database, the custom serialized canvas data corresponding to the custom cloud infrastructure;

provisioning the custom cloud infrastructure based on the custom serialized canvas data;

performing analysis on the custom cloud infrastructure;

generating a notification based on the performed analysis;

downloading, from the centralized database, the custom serialized canvas data corresponding to the custom cloud infrastructure; and performing a modification on the downloaded custom serialized canvas data.

18. A non-transitory computer readable storage medium that stores a computer program for visually generating a free-form cloud infrastructure, the computer program, when executed by a processor, causing a system to perform a plurality of processes comprising:

displaying, on a display, a plurality of icons corresponding to a plurality of cloud components and a free-form virtual canvas;

receiving a selection of a first icon corresponding to a first cloud component among the plurality of icons;

inputting the selected first icon on the free-form virtual canvas;

receiving a selection of a second icon corresponding to a second cloud component among the plurality of icons;

determining a connection compatibility between the first cloud component and the second cloud component;

when the connection compatibility between the first cloud component and the second cloud component is determined to be positive, displaying one or more possible connections between the first icon and the second icon and receiving a selection of a target connection among the one or more possible connections;

establishing a connection between the first cloud component and the second cloud component for generating custom serialized canvas data for provisioning a custom cloud infrastructure;

saving, on a centralized database, the custom serialized canvas data corresponding to the custom cloud infrastructure;

provisioning the custom cloud infrastructure based on the custom serialized canvas data;

performing analysis on the custom cloud infrastructure;

generating a notification based on the performed analysis;

downloading, from the centralized database, the custom serialized canvas data corresponding to the custom cloud infrastructure; and performing a modification on the downloaded custom serialized canvas data.

\* \* \* \* \*